United States Patent
Rethorst

[11] 4,008,866
[45] Feb. 22, 1977

[54] COMPRESSION ENERGY TRANSFORMATION SYSTEM FOR A SUPERSONIC WING

[75] Inventor: Scott Carson Rethorst, South Pasadena, Calif.

[73] Assignee: Vehicle Research Corporation, South Pasadena, Calif.

[22] Filed: June 6, 1975

[21] Appl. No.: 584,635

Related U.S. Application Data

[63] Continuation-in-part of Ser. No. 342,151, March 16, 1973, Pat. No. 3,904,151.

[52] U.S. Cl. .......................... 244/1 N; 244/42 CC
[51] Int. Cl.$^2$ ......................................... B64C 21/00
[58] Field of Search ........... 244/42 CC, 1 N, 35 R, 244/35 A, 15; 181/33 HB, 33 HC

[56] References Cited

UNITED STATES PATENTS

| | | | |
|---|---|---|---|
| 3,447,761 | 6/1969 | Whitener et al. | 244/15 |
| 3,737,119 | 6/1973 | Cheng | 244/1 N |
| 3,904,151 | 9/1975 | Rethorst | 244/1 N X |
| R24,917 | 12/1960 | Attinello | 244/42 CC |

*Primary Examiner*—Trygve M. Blix
*Assistant Examiner*—Barry L. Kelmachter

[57] ABSTRACT

A supersonic wing in turning the airstream downward to generate increased pressure on its underside also increases the air density. The energy of this compression field is normally diverted away from the wing downward towards the ground in the supersonic wave system, coalescing into a strong shock wave which dissipates most of this energy into heat, with a small residual reaching the ground and causing the sonic boom. My copending application No. 342,151, filed Mar. 16, 1973, disclosed the use of an expanding jet under a concave downward wing to transform this compression energy into vorticity. The present continuation-in-part application provides a wing section which concentrates most of the concave downward curvature of the wing underside in a short interaction region to generate the compression near its leading edge, corresponding to the short expansion region of the underexpanded jet. This correlation of the density change locations generates in adjacent regions both (1) equal magnitude and opposite sign Coriolis reaction forces due to the contrasting changes in angular momentum of the underwing streams as they are turned downward by the wing, providing a mechanism to feed energy into the transformation process, and (2) opposing sign perturbation velocities on the interface between the upper compressing stream and the lower expanding stream, thus invoking viscous forces to spin the fluid elements into an ordered form of vorticity about spanwise axes. The energy transformed into vorticity then proceeds aft with the flow under the wing, where its upwash adds to the streamwise velocity to comprise an upward inclined flow, producing an increased pressure on the undersurface enabling the wing to operate at a lesser angle with reduced drag. Residual energy unrecovered into useful work is retained as vorticity in the flow stream at the aircraft altitude, where it will eventually decay into heat, precluding its transport towards the ground to generate a sonic boom.

5 Claims, 2 Drawing Figures

COMPRESSION ENERGY TRANSFORMATION SYSTEM FOR A SUPERSONIC WING

This application is a continuation-in-part of my co-pending application Ser. No. 342,151, filed Mar. 16, 1973, now U.S. Pat. No. 3,904,151.

BACKGROUND OF THE INVENTION

A basic system to reduce the sonic boom created by a supersonic aircraft was disclosed in my U.S. Pat. No. 3,314,629 issued Apr. 18, 1967, providing a converging-diverging nozzle emitting a supersonic jet of fluid aft underneath a concave downward lower surface of a supersonic wing. My subsequent improvement application No. 342,151 filed Mar. 16, 1973 disclosed an aircraft wing system comprising a manifold/nozzle assembly extending essentially the entire span of the wing and shaping the converging-diverging nozzle to emit this jet of fluid aft as a sheet under the wing in an underexpanded manner, with a pressure greater than atmospheric. The interaction of the compressing layer of air immediately under the wing with the expanding jet layer below transforms the energy of compression into vorticity, which proceeds aft under the wing with the flow, rather than being diverted towards the ground causing the sonic boom. This negative (counterclockwise) vorticity in supersonic flow provides an upwash which adds to the stream velocity, comprising an upward inclined flow, increasing the pressure on the undersurface enabling the wing to operate at a lesser angle with reduced drag. This system recycles the otherwise wasted compression energy into useful work, thereby improving the efficiency of the aircraft and at the same time reducing the sonic boom.

BRIEF SUMMARY OF THE PRESENT INVENTION

The present invention, which is a continuation-in-part of my pending application Ser. No. 342,151, filed Mar. 16, 1973, provides a further improvement in this energy recovery system, particularly in the section geometry of the wing lower surface relative to the underwing expanding jet system, to accomplish the transformation of the dissipative wing compression energy into the beneficial form of the vorticity.

In this improved structure, the wing is provided with its underside concave downward camber concentrated in its forward extent, corresponding to the rapid expansion of the underwing jet overpressure. This correlation of the wing compression and underwing jet expansion locations concentrates in a short interaction region the changes in angular momentum due to the density changes of the underwing compressing air stream and the expanding jet stream. This provides both (1) Coriolis reaction forces which combine into a torque feeding energy into the transformation system, and (2) opposing perturbation velocities on the interface between these two streams invoking viscous forces to spin the fluid elements about spanwise axes as negative vorticity.

BRIEF DESCRIPTION OF THE DRAWINGS

The foregoing and other readily apparent features of my present invention will be better understood by reference to the following more detailed specification and accompanying drawings in which.

DETAILED DESCRIPTION OF THE PREFERRED EMBODIMENT

Figure 1:
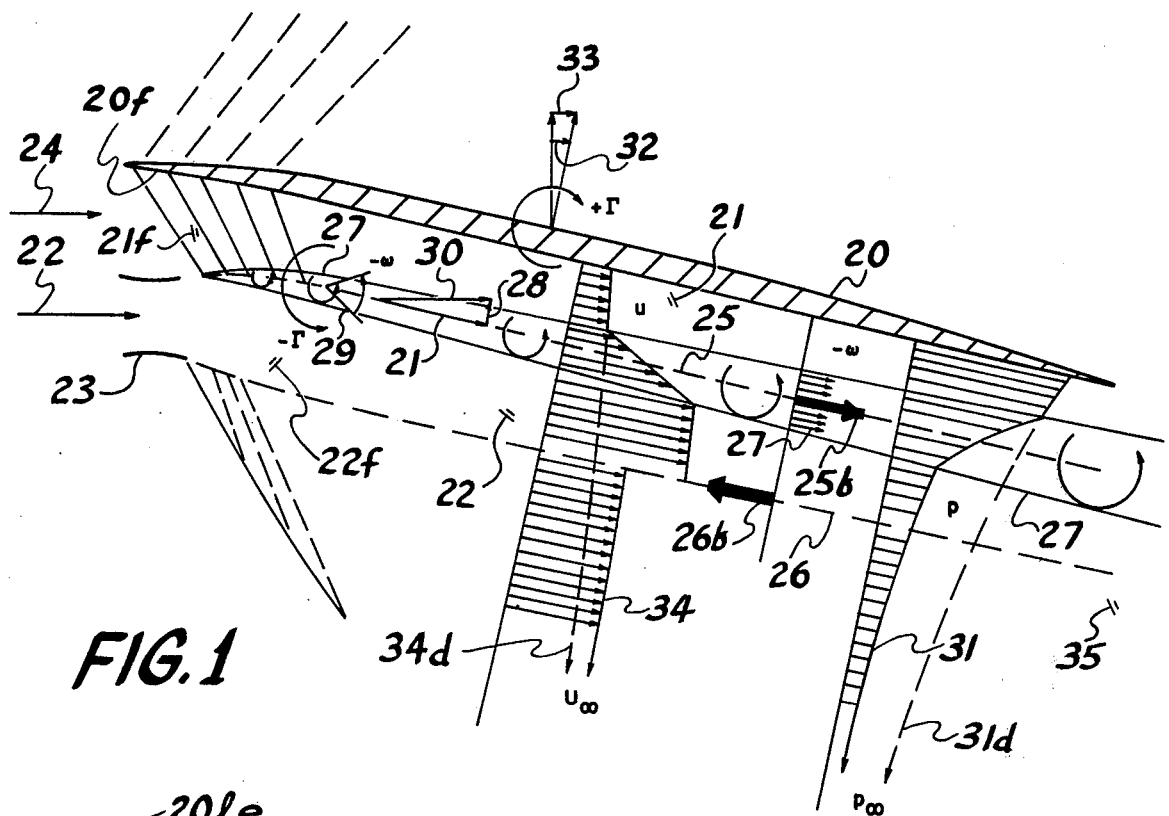
FIG. 1 is a cross-sectional view of the wing and converging/diverging nozzle emitting an expanding jet thereunder, showing the overall character of the flow field.

In the following paragraphs like numbers refer to the same or similar items from figure to figure.

The basic structure of the present invention is illustrated in the cross-sectional view of FIG. 1, providing a supersonic wing 20 compressing a layer of air 21 thereunder which extends downward to a jet sheet 22 below emitted from a forward located converging-diverging nozzle 23.

The jet sheet 22, to provide a propulsive force, is emitted with a velocity greater than the free stream 24, or the flight velocity. This increased velocity of the jet sheet 22 generates a layer of negative (counterclockwise) vorticity on the upper jet interface 25 and a layer of positive (clockwise) vorticity on the lower jet interface 26. These two static vortex sheets (not shown) are of equal magnitude and opposite sign, as represented by bold vectors 25b and 26b respectively of FIG. 1, and hence add zero net vorticity to the flow.

The present invention also provides that the converging/diverging nozzle 23 be shaped so as to emit the jet sheet 22 in an underexpanded manner, i.e., at a pressure greater than atmospheric. Such a jet, emitted into air with an overpressure, will expand rapidly and primarily in the forward extent 22f of this jet sheet 22, which accordingly may also be referred to as the expansion layer 22. Hence the present system, as shown in FIG. 1, provides the wing 20 with most of its curvature in its forward section 20f in the form of a smooth camber distribution, generating a field of weak compression waves 21f in the forward part of the compression layer of air 21 adjacent the cambered wing undersurface section 20f, thereby locating the compression field 21f adjacent the expansion field 22f.

Figure 2:
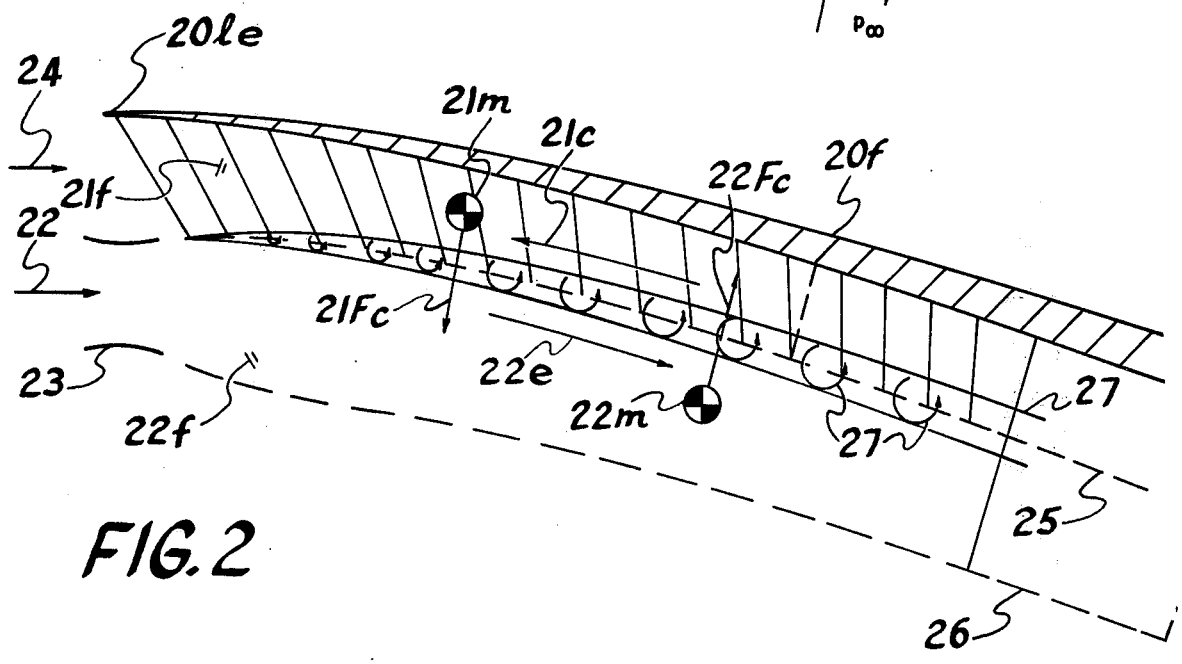
FIG. 2 is a cross-sectional view of the forward part of the wing/jet system of FIG. 1, illustrating the vorticity generation in more detail.

Thus the (1) compression field 21f, generated by the wing and the (2) expansion field 22f provided by the jet comprise a short interaction region under the forward part of the wing 20f as shown in more detail in FIG. 2.

The basic energy transformation system essentially employs density and hence angular momentum changes in the underwing air and jet streams providing a dynamic mechanism to transform the compression energy into a further vorticity contribution, thereby precluding coalescence of this compression energy into the usual shock wave. The upper air stream 21f, being compressed by the wing, has a shift in its center of mass 21m forward. The lower jet stream 22f, due to its expansion, has a shift in its center of mass 22m aft. Both of these stream elements are part of the field which is turned downward by the cambered forward wing section 20f about the wing leading edge 20le as the axis of rotation, and hence these mass shifts involve changes in the angular momentum L of these elements in this downward rotation.

Thus the angular momentum $L_{air}$ of the compressing air stream element 21f is decreased due to this foward (inward) shift in its center of mass, whereas the angular momentum $L_{jet}$ of the expanding jet stream element 22f is increased due to this aft (outward) shift in its center of mass.

The decrease in angular momentum of the air stream 21f generates a Coriolis reaction force 21F$_c$ down, where the increase in angular momentum of the jet stream 22f generates a reaction Coriolis force 22F$_c$ up. These forces, acting in opposite directions through centers of mass displaced by compression and expansion, constitute a dynamic mechanism providing a couple and torque, which feeds energy into the transformation system.

This energy source then drives the vorticity generation mechanism provided by the viscous interaction of the forward perturbation velocity 21c in the compressing stream 21f and the aft perturbation velocity 22e in the expanding stream 22f on their interface 25, spinning segments of the two fluid elements 21f and 22f as a unit in the counterclockwise direction as negative vorticity 27, represented in distributed vector form in FIG. 1.

The product of this Coriolis force F$_c$ and its moment arm r comprises a torque $\tau$ which is equal to the rate of change of angular momentum, i.e., $$\tau = F_c r = dL/dt$$

where
$\tau$ = torque
F$_c$ = Coriolis force
r = radius to force application
L = angular momentum
d/dt = time rate of change This energy transformation mechanism is thus essentially dynamic, i.e., it employs contrasting rates of change of angular momentum of (1) the compressing air stream, and (2) the expanding jet stream to provide opposing Coriolis reaction forces which feed energy into the viscous mechanism generating vorticity on the interface between the two streams.

The dynamic vorticity 27 thus generated proceeds downstream with the flow, combining into a series of discrete rollers, all with a negative sense of rotation about spanwise axes, growing in an ordered manner, constituting a vortex flap 27. In a supersonic flow such a negative vortex 27 provides an upwash 28, reflecting the speed of sound restriction of its contribution to its downstream Mach cone 29. This upwash 28 adds to the stream velocity 21 to comprise an upward inclined flow 30 providing an increased pressure 31 on the underside of the wing, enabling the wing 20 to operate at a lesser angle 32 with reduced drag 33. The increase in underwing pressure developed by this mechanism provides a major alteration in the entire flow field, which follows from the severely altered gradients of the flow properties generated by the rotation in the underwing vortex flap. FIG. 1 illustrates the vertical variation of these flow properties, namely (a) the pressure p 31, (b) the vorticity $\omega$ 27, and (c) the velocity u 34.

The pressure profile p 31 illustrates the vertical pressure gradient through the underwing flow field, and in particular the increase in pressure in the compression layer 21 on the underside of the wing 20. The substantial pressure gradient shown through the vortex flap 27 is sustained by the asymmetric nature of its internal rotational structure due to the speed of sound. The lesser pressure rise 31 below the jet 22 caused by the vortex/upflow 27 is shown solid as compared with the usual profile 31d shown dashed.

The vorticity profile $\omega$ 27 illustrates the distributed negative vorticity generated by the dynamic mechanism on the upper jet interface 25. The bold vectors 25b and 26b represent the equal and opposite sign static vorticity contributions on the upper and lower surfaces respectively of the jet due to its higher velocity.

The velocity profile u 34 illustrates the effect of the forward wing section 20f in reducing the velocity on its underside in the compression layer 21f. The increased velocity in the jet 22f, by the dynamic/viscous mechanism described, then generates the vorticity corresponding to the substantial velocity gradient shown on the upper jet interface 25. The sharp decrease in velocity at the lower boundary 26 of the jet is also illustrated, and the increased total velocity below the jet provided by the vortex perturbation increment is shown in a solid line 34 for comparison with the usual velocity profile 34d shown dashed.

The dashed and solid profiles shown in FIG. 1 illustrate the benefit derived from negative vorticity generation. Without the vorticity, the jet would be deflected downward to a greater extent by the pressure generated from the wing 20. The outer flow 35 beneath the jet 22 would then in turn be subjected to greater downward deflection. This greater downward deflection is associated with higher static pressures (greater compression) and greater velocity decrease (as depicted by dashed lines on the pressure and velocity profiles). Thus, vorticity generation on the jet interface 25 limits or reduces the compressive field produced by the lifting wing, primarily by the extended action of this vorticity aft of the wing as a vortex flap 27.

This longer effective chord/reduced angle wing system spreads the downward momentum producing the lift over an increased mass of air, leaving less energy in the wake, corresponding to a reduced drag. Thus a major portion of the energy in the vortex formation is recovered into useful work, and any residual energy is retained as vorticity in the flow stream at the aircraft altitude, where it will eventually decay into heat, precluding its transport towards the ground to generate a sonic boom.

In summary, the system employs changes in angular momentum due to mass shifts in the underwing compressing and expanding layers of fluid to provide a dynamic mechanism feeding the compression energy into rotation developed by viscosity, thus transforming the compression energy into vorticity which continues aft under the wing with the flow to benefit lift rather than being diverted away towards the ground to coalesce into a strong shock wave, thereby obviating its decay into heat and causing the sonic boom.

It is clear from this disclosure and its accompanying set of figures that the means of transforming the compression energy generated by the underside of a supersonic wing into vorticity have been described in detail, and the magnitude of the provisions disclosed may be varied according to engineering considerations for different conditions as required.

While the preferred form and method of employing the invention have been described and illustrated, it is to be understood that the invention lends itself to numerous other embodiments without departing from its basic principles.

Having thus described my invention what I claim as novel and desire to secure by Letters of Patent of the United States is:

1. An aircraft wing system to fly at supersonic speeds, said wing system comprising a wing having:

a lower surface element having its leading edge at substantially zero angle of attack and having a major portion of its downward concave curvature in its forward extent; said wing generating a compression layer of air thereunder; and
  an underwing nozzle to emit a supersonic jet of fluid at a pressure greater than atmospheric comprising an expansion layer located below said compression layer wherein the correlation of the wing compression layer at the forward past of the wing and the short jet expansion concentrates density changes produced by said wing and said nozzle in adjacent regions and generates both (1) opposing sign perturbation velocities on the interface between the compression layer and the expansion layer, thereby invoking viscous forces to generate an ordered form of vorticity by spinning elements of said layers about spanwise axes, and (2) equal magnitude and opposite sign Coriolis reaction forces due to the contrasting changes in angular momentum of said layers as said layers are turned downward by the wing, and thereby forming a mechanism to feed energy into the vorticity generation process, and providing a downstream upwash producing at supersonic speeds an increased pressure on the lower surface enabling the wing to operate at a lesser angle with reduced drag.

2. An aircraft wing system per claim 1, where:
said downward concave curvature is concentrated in a chord length corresponding to the expansion length of the supersonic fluid jet providing equal magnitude perturbation velocities as well as said opposing sign perturbation velocities on the interface, thereby optimizing the vorticity generation.

3. An aircraft wing system per claim 1, where:
said downward concave curvature is proportioned so that said wing produces a chordwise perturbation velocity in said underwing compression layer having a gradient equal in magnitude but opposite in sign to the chordwise perturbation velocity gradient in said jet expansion layer.

4. An aircraft wing system per claim 1, where:
said downward concave curvature is proportioned so that said density change generated by said wing in said underwing compression layer has a chordwise gradient equal in magnitude but opposite in sign to the chordwise density gradient in said jet expansion layer.

5. An aircraft wing system per claim 1, where:
said underwing nozzle is shaped to emit said jet of fluid with chordwise gradients of energy components equal in magnitude but opposite in sign to the chordwise gradients of the energy components generated by the wing lower surface element in said compression layer.

* * * * *